United States Patent [19]

Kusuda

[11] Patent Number: 5,333,288
[45] Date of Patent: Jul. 26, 1994

[54] EFFECTIVE ADDRESS PRE-CALCULATION TYPE PIPELINED MICROPROCESSOR

[75] Inventor: Masahiro Kusuda, Tokyo, Japan

[73] Assignee: NEC Corporation, Tokyo, Japan

[21] Appl. No.: 660,779

[22] Filed: Feb. 25, 1991

[30] Foreign Application Priority Data

Feb. 23, 1990 [JP] Japan ................... 2-44018

[51] Int. Cl.[5] ............... G06F 9/34; G06F 9/38; G06F 12/06
[52] U.S. Cl. ................ 395/400; 395/375; 395/775
[58] Field of Search ............. 395/375, 400, 775

[56] References Cited

U.S. PATENT DOCUMENTS 4,775,933 10/1988 Sato ........................... 395/400
5,167,026 11/1992 Murray et al. ............... 395/375

FOREIGN PATENT DOCUMENTS 0155211 2/1985 European Pat. Off. .
0201833 5/1986 European Pat. Off. .
0230038 12/1986 European Pat. Off. .

OTHER PUBLICATIONS

A. Goyal et al., "Base Register Buffer to Eliminate Address Generation Time in IBM System/370 Architectures"; IBM Technical Disclosure Bulletin, vol. 31, No. 12 May 1989, pp. 321-322.
J. M. Angiulli, et al., "Enhancements in Implementing Load Address"; IBM Technical Disclosure Bulletin, vol. 23, No. 6, Nov. 1980, pp. 2401-2403.

*Primary Examiner*—Joseph L. Dixon
*Assistant Examiner*—Jack A. Lane
*Attorney, Agent, or Firm*—Whitham, Curtis & Whitham

[57] ABSTRACT

An effective address pre-calculation type pipelined microprocessor comprises a register file which can be used for a base address for an operand address and an effective address calculation unit for calculating and generating an effective address of an operand prior to execution of an instruction, by using a register included in the register file as a base address register. A copy register is provided for selecting and holding either the calculated effective address or a modification amount added result obtained by adding a constant number to the calculated effective address, and a copy valid flag is provided for storing a history of a written condition of the copy register. When an auto-modification designation mode is detected, a calculated effective address or the modification amount added result is written to the copy register. A copy register identification code latch stores an identification code of a register which is used as a base address register in the auto-modification designation mode. When the copy valid flag indicates that the copy register has been written and when a value of the copy register identification code latch is consistent with a base address register number, the value of the copy register is supplied to the effective address calculation unit.

4 Claims, 6 Drawing Sheets

FIGURE 6 mov r0 , [−r31] .....INSTRUCTION ① mov r1 , [r31+] .....INSTRUCTION ②

INSTRUCTION ① IS AN INSTRUCTION FOR TRANSFERRING THE VALUE OF r0 TO THE MEMORY ADDRESS OF (r31−DATA SIZE) AND FOR MAKING THE VALUE OF (r31−DATA SIZE) AS A NEW r31 VALUE.

INSTRUCTION ② IS AN INSTRUCTION FOR TRANSFERRING THE VALUE OF r1 TO THE MEMORY ADDRESS OF (r31) AND FOR MAKING THE VALUE OF (r31+DATA SIZE) AS A NEW r31 VALUE.

EFFECTIVE ADDRESS PRE-CALCULATION TYPE PIPELINED MICROPROCESSOR

BACKGROUND OF THE INVENTION

1. Field of the Invention

The present invention relates to an effective address pre-calculation type pipelined microprocessor, and more specifically, to a mechanism for avoiding a register hazard generated at the time of the effective address pre-calculation.

2. Description of Related Art

In the prior art, some large-sized computers operating in a pipelined manner comprise copy registers provided in an effective address calculation unit or an instruction decoder unit for the purpose of copying contents of all general purpose registers. In these large-sized computers, when an instruction for changing a content of some general purpose register is decoded, the effective address calculation unit or the instruction decoder unit estimates the result of execution of the instruction, and updates a value of a copy register holding the copy of the general purpose register. When a general purpose register is used as a base register for the register indirect addressing, the copy register copying the general purpose register is used as the base register, so that a register hazard which would be generated in the effective address pre-calculation is avoided.

However, if the above mentioned arrangement is adopted, the hardware inevitably becomes vary large. Because of this reason, a microprocessor which adopts the same effective address pre-calculation type pipelined system cannot adopt the above mentioned arrangement for the large-sized computer. As a result, the effective address precalculation type pipelined microprocessor cannot avoid the register hazard in the case that a general purpose register which can be modified in accordance with an auto-modification addressing in a preceding instruction is used in a register indirect addressing in a succeeding instruction.

For example, there is known an addressing mode in which a base address register value is addressed as an operand address, and thereafter, when an instruction is executed, the base address register value is incremented or decremented by an amount corresponding to the data size. This mode is called a "post-modification addressing" hereinafter. There is also known an addressing mode in which the base address register value is added with or subtracted by the amount corresponding to the data size so that the result of the addition or subtraction is used as the operand address, and when an instruction is executed, the base address register value is written with the result of the addition or subtraction of the data size. This mode is called "pre-modification addressing" hereinafter. The post-modification addressing and the pre-modification addressing are collectively called an "auto-modification addressing" hereinafter. If a general register designated to be modified in the auto-modification addressing in a preceding instruction is used as a base address register in a succeeding instruction before it is actually modified by an instruction execution unit, a so-called register hazard occurs, and an address generation for the succeeding instruction cannot be executed until execution of the preceding instruction having the preceding auto-modification addressing has been completed. As a result, the pipelined operation stops in the stage for the effective address calculation. Namely, a job opening occurs in the pipelined operation.

SUMMARY OF THE INVENTION

Accordingly, it is an object of the present invention to provide an effective address pre-calculation type pipelined microprocessor, which has overcome the above mentioned defect of the conventional one.

Another object of the present invention is to provide an effective address pre-calculation type pipelined microprocessor, capable of decreasing the register hazard occurring in the pipelined operation, without extremely increasing the scale of the circuit.

The above and other objects of the present invention are achieved in accordance with the present invention by an effective address precalculation type pipelined microprocessor comprising:

a register file which can be used for a base address for an operand address;

an effective address calculation unit for calculating and generating an effective address of an operand prior to execution of an instruction, by using a register included in the register file as a base address register;

a copy register for selecting and holding either the calculated effective address or a modification amount added result obtained by adding a constant number to the calculated effective address;

a mechanism for detecting a predetermined addressing mode indicative of a predetermined operand address designation mode;

a control mechanism for writing the calculated effective address or the modification amount added result to the copy register when the predetermined addressing mode is used;

a copy valid flag for storing a written condition of the copy register;

a copy register identification code latch for storing an identification code of a register which is used as a base address register when the predetermined addressing mode is designated; and a data path means for supplying the value of the copy register to the effective address calculation unit when the copy valid flag indicates that the copy register has been written and when a value of the copy register identification code latch is consistent with a base address register number.

In one preferred embodiment, the effective address pre-calculation type pipelined microprocessor includes a second control mechanism for previously determining a register identification code held in the copy register identification code latch, so that the determined register identification code designates a predetermined register, the second control mechanism operating to individually execute the writing to the copy register and the reading from the effective address calculation unit only when it is detected as the result of decoding of all or a part of an instruction code that the predetermined register is used as the base address register.

In another preferred embodiment, the effective address precalculation type pipelined microprocessor includes a mechanism for inhibiting a latch operation of the copy register identification code latch when the identification code of the base address register is consistent with the identification code of the predetermined register, and a third control mechanism for individually executing the writing to a specially provided exclusive copy register and the reading from the effective address calculation unit only when the predetermined register is used as the base address register.

According to another aspect of the present invention, there is provided an effective address pre-calculation type pipelined microprocessor comprising:

an instruction execution unit including a general register file, the general register including a predetermined register that has a high degree of frequency used as an indirect register in an auto-modification register indirect addressing;

an effective address calculation unit for calculating an effective address of a memory operand prior to execution of an instruction by the instruction execution unit;

a copy address register for holding a copy of a value of the predetermined register;

a mechanism for precedently calculating a modification result of the predetermined register which is obtained when a given instruction has been executed by the instruction execution unit, when the auto-modification addressing using the predetermined register is executed in response to the given instruction, and in parallel to generation of the effective address in the effective address calculation unit, the mechanism operating to write the result of the pre-calculation into the copy address register;

a mechanism for detecting that the predetermined register will be used as the base address register in the register indirect addressing at an effective address pre-calculation stage for a succeeding instruction; and a mechanism for using a value of the copy address register in place of the predetermined register included in the general register file, when the detection mechanism detects that the predetermined register will be used as the base address register in the register indirect address.

As mentioned above, the mentioned arrangement, the effective address pre-calculation type pipelined microprocessor comprises the mechanism operating, when the auto-modification addressing mode is used for a preceding instruction and when a register designated in the auto-modification addressing mode for the preceding instruction is used as a base address register in a succeeding instruction, to cause the copy register to hold a value of the after-modification base address register calculated at the time of generating an effective address in the preceding instruction, and to precedently supply the held value as a base address register value in the succeeding instruction.

With the above mentioned arrangement, it is possible to effectively avoid, by means of a relatively small scale of additional hardware, a register hazard which would occur at a stage of effective address precalculation for the succeeding instruction using as the base address register the same register as the general register used in the auto-modification register indirect address for the preceding instruction.

The above and other objects, features and advantages of the present invention will be apparent from the following description of preferred embodiments of the invention with reference to the accompanying drawings.

DESCRIPTION OF THE PREFERRED EMBODIMENTS

Figure 1:
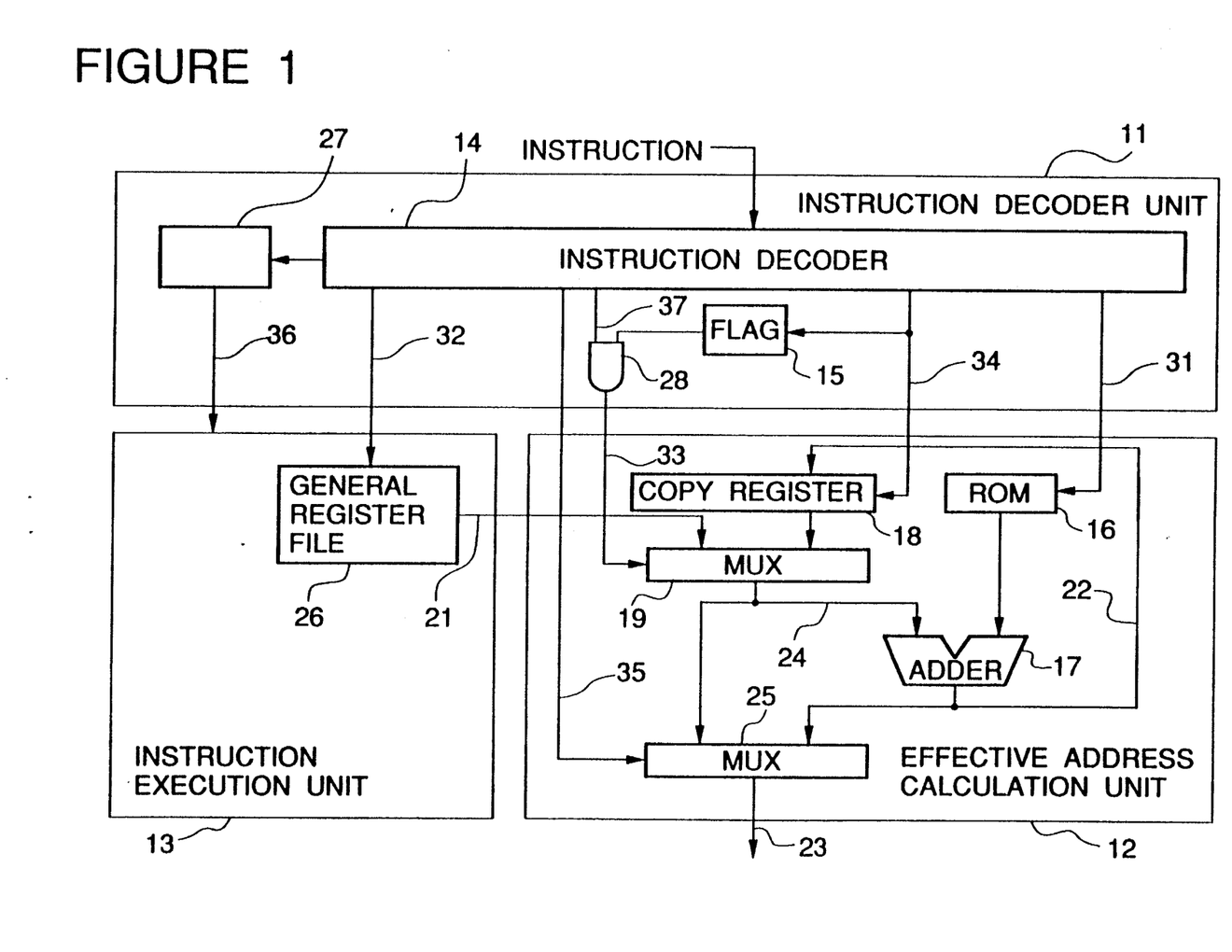
FIG. 1 is a block diagram of a first embodiment of the effective address pre-calculation type pipelined microprocessor in accordance with the present invention.

Referring to FIG. 1, there is shown a block diagram of a first embodiment of the effective address pre-calculation type pipelined microprocessor in accordance with the present invention.

The shown effective address pre-calculation type pipelined microprocessor includes a stack pointer contained in a general purpose register, and has two kinds of auto-modification indirect address functions, namely, a post-increment register indirect addressing mode and a pre-decrement register indirect addressing mode, both of which use the stack pointer as the base address.

As shown in FIG. 1, the effective address pre-calculation type pipelined microprocessor includes an instruction decoder unit 11, an effective address calculation unit 12 and an instruction execution unit 13.

The effective address calculation unit 12 includes a constant number ROM (read only memory) 16 for outputting a modification amount used for calculating an after-modification register value of a register used for the auto-modification indirect addressing, an address adder 17 for adding the modification amount with data on a base register bus 24, and an operand address multiplexor 25 for selecting either the data on the base register bus 24 or an output of the address adder 17 in accordance with an operand address selection signal 35 from the instruction decoder unit 11, and for supplying the selected address onto an operand address bus 23. The effective address calculation unit 12 also includes an effective address write back bus 22 for supplying the address addition result of the address adder 17 to a copy address register 18, and a base address multiplexor 19 operating on the basis of a base address register selection signal 33 from the instruction decoder unit 11, so as to multiplex an output of a general purpose register file 26 in the instruction execution unit 13 supplied through a base register bus 21 or an output of the copy register 18 for the purpose of supplying a selected one onto the base register bus 24.

The instruction decoder 11 comprises an instruction decoder 14 receiving a given instruction, an instruction execution designation information register 27, and a copy register valid flag 15. As a result of decoding of the given instruction, the instruction decoder 14 outputs the modification amount designation signal 31 designating one of outputs of the constant number ROM 16. In addition, the instruction decoder 14 outputs a copy write signal 34, a base register designation signal 32 for designating a general register used as the base address register, a stack pointer use detection signal 37 showing that a stack pointer to be copied as the base address register has been designated, and the above mentioned operand address selection signal 35 indicating whether or not the predecrement register indirect address calculation is performed.

The instruction execution unit 13 includes the above mentioned general purpose register file 26 which is used as the base address register in the register indirect addressing mode.

Information for execution of the modification and the instruction is set in the instruction execution designation information register 27 after the effective address calculation, and an output of the instruction execution designation information register 27 is supplied as the instruction execution designation information 36 to the instruction execution unit 13.

In the above mentioned effective address pre-calculation type pipelined microprocessor in accordance with the present invention, the effective address calculation for the register indirect addressing is executed by using, as the base address, the output of a general register which is included in the general register file 26 of the instruction execution unit 13 and which is designated by the base register designation signal 32.

In the case that the pre-decrement register indirect addressing is designated as the address mode by a given instruction, the operand address multiplexor 25 is supplied with the operand address selection signal 35 for causing data on the base address bus 24 to be outputted to the operand address bus 23. On the other hand, in the case that one of the other address modes is designated, the operand address multiplexor 25 is supplied with the operand address selection signal 35 for causing the output of the address adder 17 to be outputted to the operand address bus 23.

In addition to the above mentioned situations, if the auto-modification register indirect address mode is designated, one modification amount is designated by the modification amount designation signal 31 and the designated modification amount is outputted from the constant number ROM 16, so that the designated modification amount is added with the data on the base address bus 24 by the address adder 17.

If the stack pointer is designated as the base register for the auto-modification register indirect address calculation, the copy write signal 34 is activated so that the data outputted from the address adder 17 and supplied through the effective address write back bus 22 is written to the copy address register 18, and at the same time, the copy register valid flag 15 is activated.

In an instruction following the above discussed instruction, when a stack pointer is used as the base address register, if the copy register valid flag 15 is active, the output of the copy address register 18 is used in place of the data on the base register bus 21 which is the output of the general register file 26.

Which of the data on the base register bus 21 and the output data of the copy address register 18 should be used as the base address, is designated by the base address register selection signal 33 from an AND gate 28 receiving the stack pointer use detection signal 37 and the copy register valid flag 15, namely, a logical product of the stack pointer use detection signal 37 and the copy register valid flag 15. If the base address register selection signal 33 is active, the output data of the copy address register 18 is used as the base address.

As mentioned above, by properly selecting either the content of the general register or the content of the copy address register, the effective address pre-calculation type pipelined microprocessor in accordance with the present invention does not have a waiting caused by the register hazard in the register indirect address calculation when the stack pointer is in use. Therefore, the efficiency of the pipelined operation does not decrease.

As seen from the above, the first embodiment of the effective address pre-calculation type pipelined microprocessor in accordance with the present invention includes the copy address register provided in the effective address calculation unit for holding an estimated value of the result of modification in a selected general register having a high degree of frequency that the register is used in the auto-modification addressing. Therefore, in an effective address calculation for a succeeding instruction, if the selected general register is used as the base address in the register indirect addressing, the value of the copy address register provided in the effective address calculation unit is used as a substitution, so that a proper effective address value can be used.

In particular, if copy registers for registers that constitute a portion of the stack pointer frequently used as the base address register in the auto-modification addressing are provided within the effective address calculation unit, generation of the register hazard at the effective address calculation stage in the pipelined microcomputer can be effectively suppressed with only a small amount of additional hardware, and therefore, decrease of the pipeline efficiency can be prevented.

Figure 2:
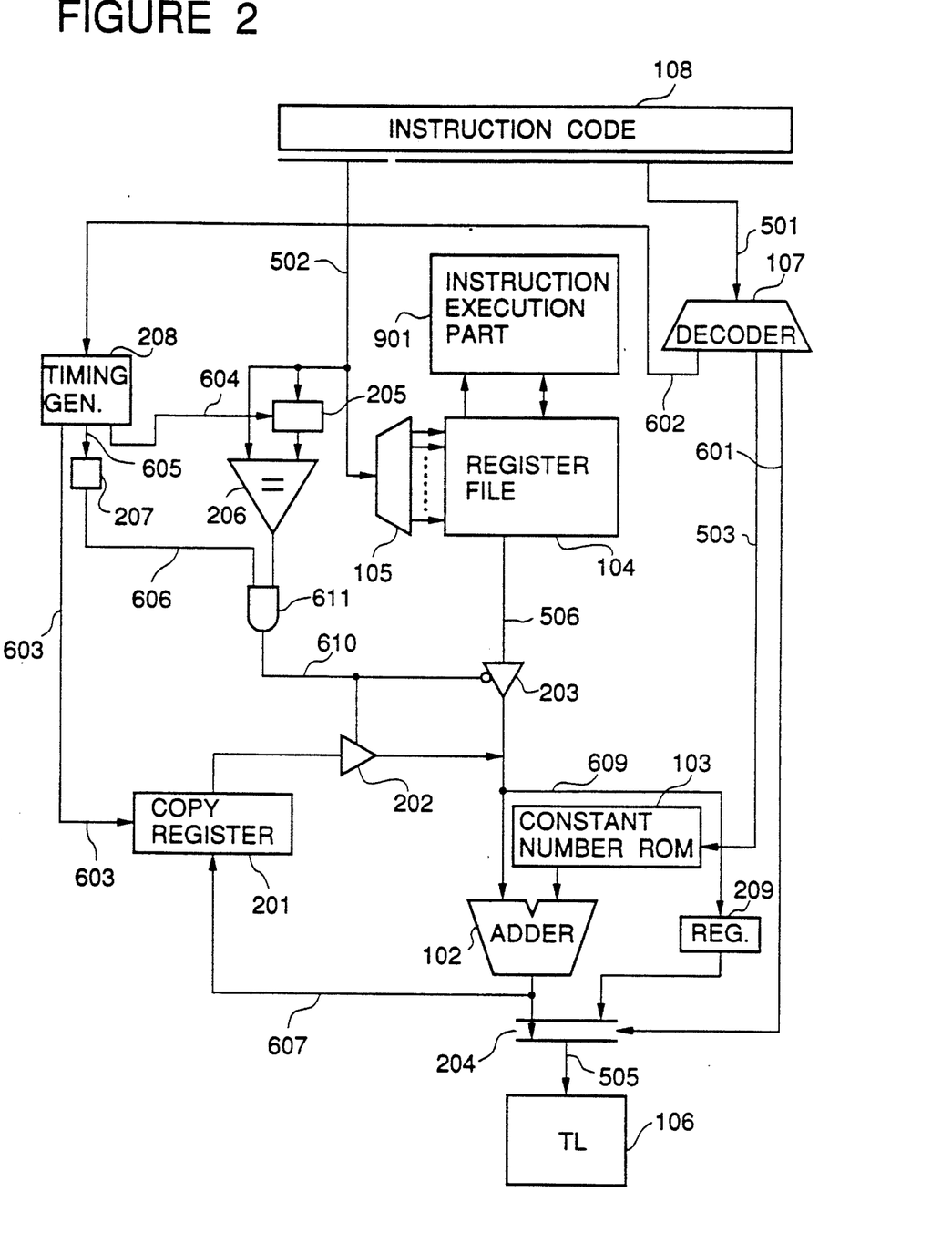
FIGS. 2, 3 and 4 are block diagrams of essential parts for the effective address pre-calculation in second, third and fourth embodiments of the effective address pre-calculation type pipelined microprocessor in accordance with the present invention.

Referring to FIG. 2, there is shown a block diagram of essential parts for the effective address pre-calculation in a second embodiment of the effective address pre-calculation type pipelined microprocessor in accordance with the present invention.

The shown effective address pre-calculation type pipelined microprocessor in accordance with the present invention includes an addressing mode decoder 107 receiving an addressing mode description part 501 of a given instruction code 108. This decoder 107 generates a modification amount designation signal 503, an effective address selection signal 601 and an auto-modification addressing detection signal 602. On the other hand, a base address register identification code part 502 of the given instruction code 108 is supplied to a base address decoder 105 coupled to a register file 104, so that the decoder 105 controls the register file 104 to output a selected base address register value 506. The register file 104 is also coupled to an instruction execution part 901.

The shown effective address pre-calculation type pipelined microprocessor also includes an constant number ROM 103 responding to the modification amount designation signal 503 for supplying a designated modification amount to an effective address adder 103 in the case of a pre-modification addressing. The effective address adder 102 outputs, as an effective address, a value obtained by adding the modification amount to the base address register value 506 on a base address bus 609. On the other hand, in the case of the post-modification addressing, the constant number ROM 103 is controlled to output a zero so that the base address register value 506 on the base address bus 609 is supplied as it is.

Furthermore, the shown effective address pre-calculation type pipelined microprocessor includes a copy register identification code latch 205 for storing the base address register identification code part 502, and an identification code comparator 206 for comparing the base address register identification code pan 502 with a value held in the copy register identification code latch 205 in order to detect that the base address register identification code part 502 is equal to the value held in the copy register identification code latch 205.

In addition, the shown effective address pre-calculation type pipelined microprocessor includes a copy register 201 for holding an output 607 of the effective address adder 102, a base address bypass register 209 for holding the value on the base address bus 609, and an effective address multiplexor 204 which receives the output of the effective address adder 102 and an output of the base address bypass register 209, and which is controlled by the effective address selection signal 601 outputted from the addressing mode decoder 107 so as to select either the output of the effective address adder 102 or an output of the base address bypass register 209. The selected address is supplied to an address translator (translation table TL) 106.

Furthermore, a copy register output buffer 202, a register file output buffer 203 and a copy register valid flag 207 are provided as shown. An output of the copy register valid flag 207 and an output of the identification code comparator 206 are coupled to an AND gate 611, which generates a copy register read signal 610 supplied to a non-inverted control input of the copy register output buffer 202 and an inverted control input of the register file output buffer 203.

In addition, a timing generator 208 is provided to receive the automodification addressing detection signal 602 and to generate a copy register identification code latch signal 604 for defining a timing at which the base address register identification code 502 is latched in the copy register identification latch 205 in the automodification addressing. The timing generator 208 also generates a copy register latch signal 603 for defining a timing at which the output 607 of the effective address adder 102 is latched into the copy register 201, and a copy valid set signal 605 for setting the copy register valid flag 207. Incidentally, the copy register valid flag 207 is invalid in an initialized condition.

Figure 6:
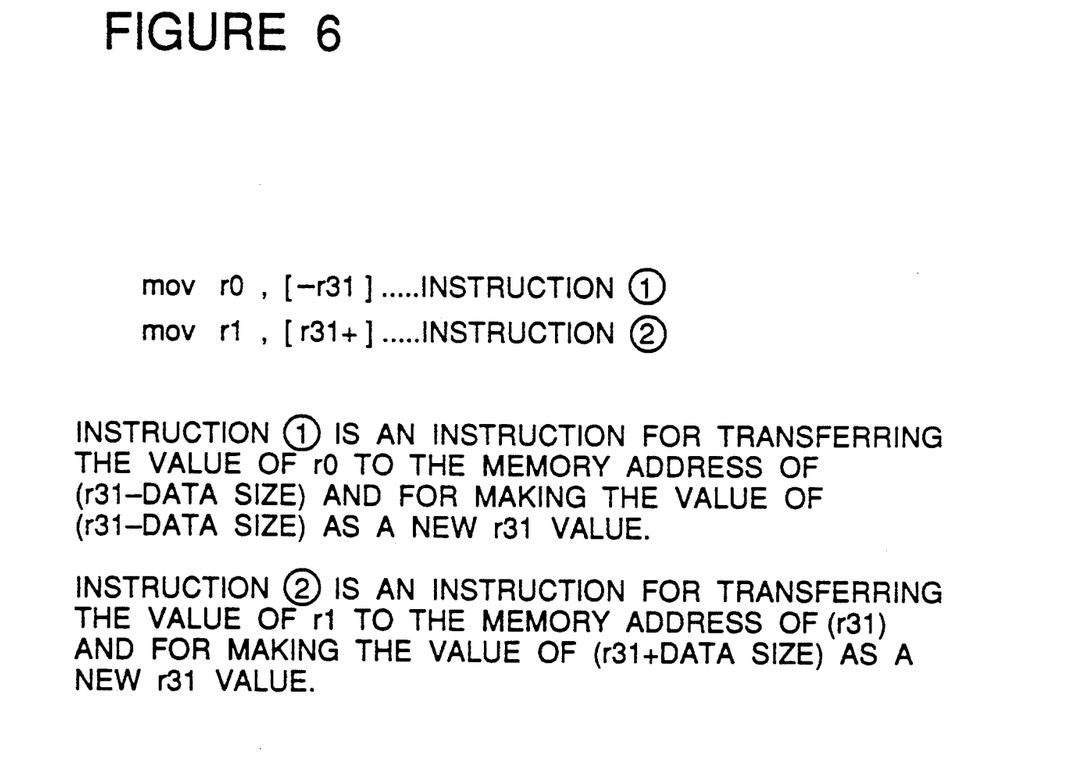
FIG. 6 is an example of instructions for showing the advantage of the embodiment of in the effective address pre-calculation type pipelined microprocessor in accordance with the present invention.

Now, assume that instructions ① and ② shown in FIG. 6 are supplied to the second embodiment of the effective address pre-calculation type pipelined microprocessor. At a stage of an effective address calculation stage for the instruction ①, a value of a register r31 is supplied from the register file 104 through the register file output buffer 203 to the base address bus 609, and at the same time, the modification amount designation signal 503 and the effective address selection signal 601 are outputted from the addressing mode decoder 107 so as to ensure that a modification amount is supplied from the constant number ROM 103 to the effective address adder 102 so that the result of the addition between the value of the register r31 and the modification amount is supplied to the effective address output 505.

On the other hand, in response to the auto-modification addressing detection signal 602, the timing generator 208 outputs the copy register latch signal 603 to the copy register 201 so as to cause the copy register 201 to latch the output 607 of the effective address adder 102. In addition, the timing generator 208 generates the copy register identification code latch signal 604 so as to cause the copy register identification code latch 205 to latch the base address register identification code 502 designated in the instruction ①. The timing register 208 also generates the copy valid set signal 605 to set the copy register valid flag 207.

Next, description will be made on timings in the effective address calculation stage for the instruction ②. The base address register identification code 502 included the instruction code 108 indicates the register r31, similarly to the instruction ①, and therefore, is consistent with the value of the copy register identification code latch 205, so that the identification code comparator 206 generates an active output. A logical product between the output of the identification code comparator 206 and the copy register valid signal 606 outputted from the copy register valid flag 207 is brought into an active condition, which is supplied as an active copy register read signal 610. As a result, the buffer 202 is turned on so that the value of the copy register 201 is supplied to the base address bus 609.

At the same time, the buffer 203 is turned off by the active copy register read signal 610, so that the base address register value 506 outputted from the register file 104 is inhibited from being supplied to the base address bus 609.

Here, since the value of the copy register 201 is the value obtained by estimating the result of the execution of the instruction ①, the register hazard does not occur.

In addition, since the instruction ② has the post-modification addressing, the effective address selection signal 601 controls the effective address multiplexor 204 so that the effective address output 505 is given by the value on the base address bus 609 which is held in the base address bypass latch 209. At a last timing of the effective address calculation stage for the instruction ②, the output 607 of the effective address adder 103 is latched in the copy register 201 again, so that the result of the post-modification addressing, namely, the value of the register r31 after the execution of the instruction ② is obtained.

As seen from the above, the register hazard which would occur in the course of execution of the instruction ② in the conventional microprocessor is avoided.

Figure 5:
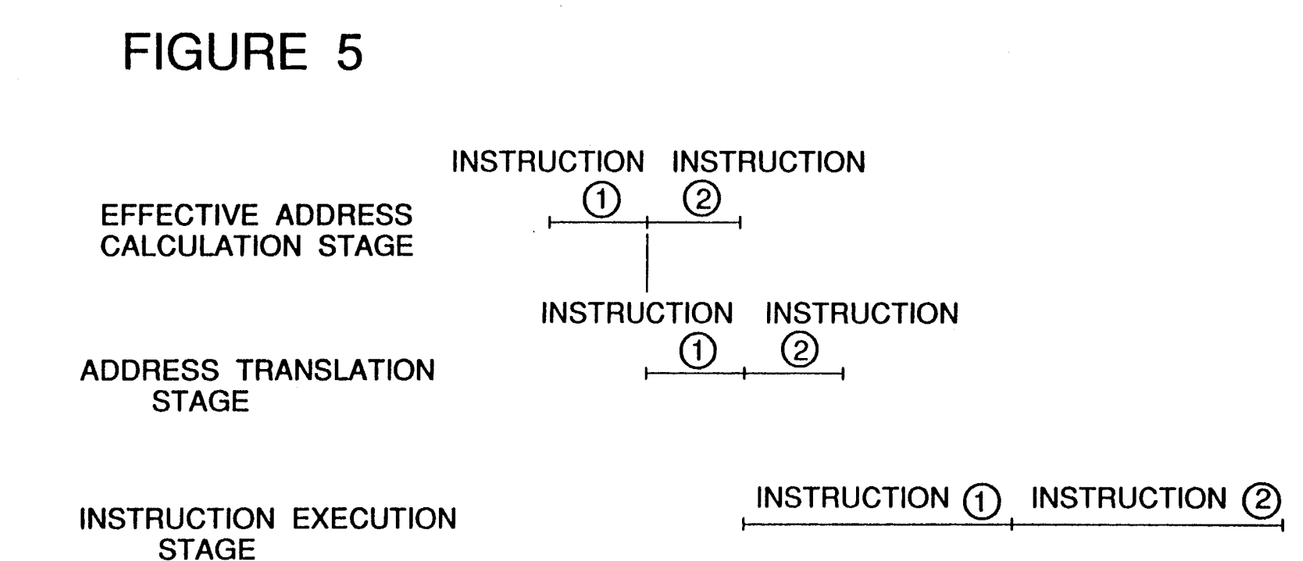
FIG. 5 is a timing chart showing the effective address calculation and the instruction execution in the effective address pre-calculation type pipelined microprocessor in accordance with the present invention.

As well known, in the effective address pre-calculation type pipelined microprocessor, a processing of each instruction after the decoding of the instruction can be divided into an effective address calculation stage, an address translation stage and an instruction execution stage. Timings of the above three stages in the course of execution of the instructions ① and ② are shown in FIG. 5. As shown in FIG. 5, a period of the effective address pre-calculation for the instruction ② is shortened, and a job opening at the instruction execution stage between the instructions ① and ② is not generated.

Figure 3:
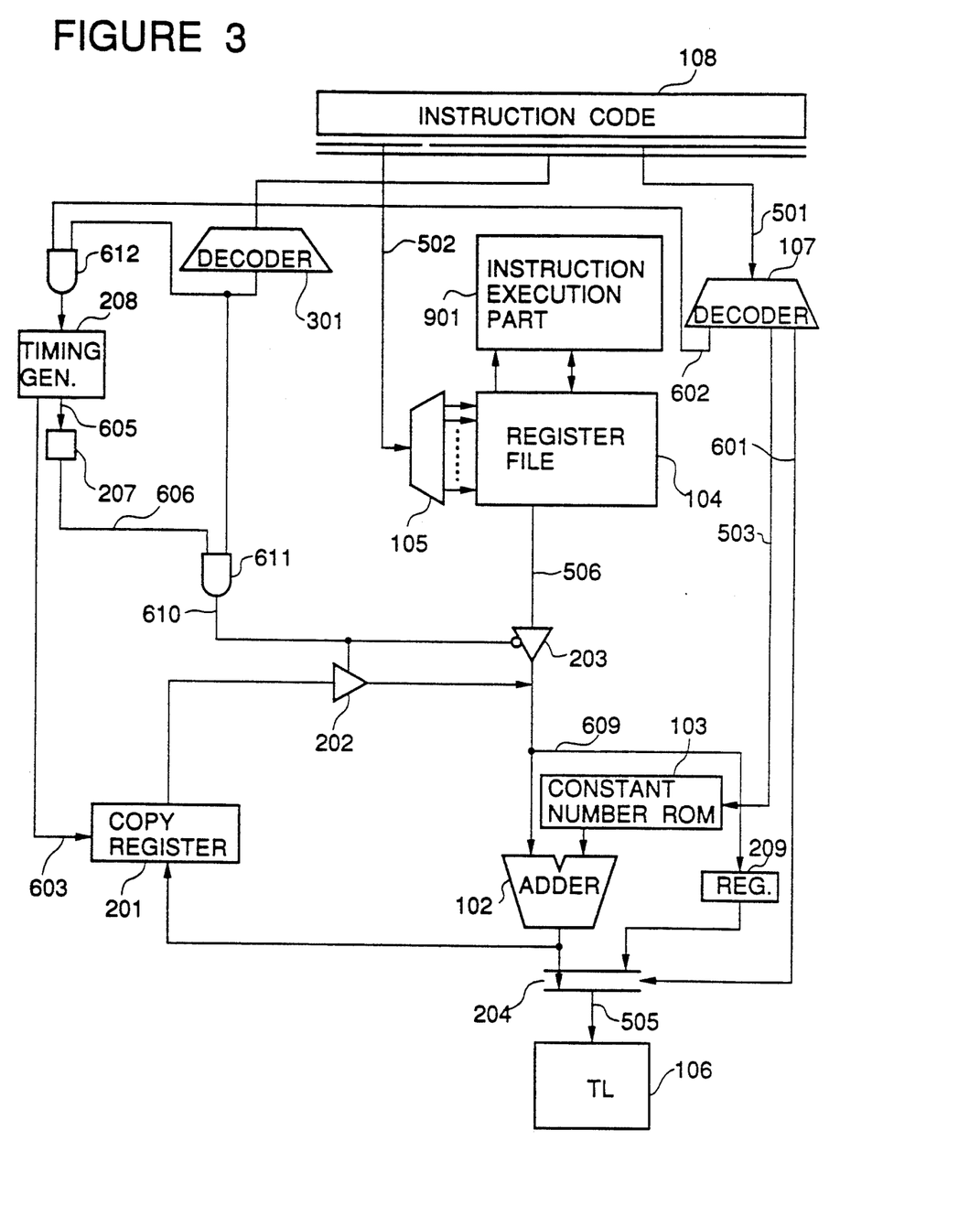

Turning to FIG. 3, there is shown a block diagram of essential parts for the effective address pre-calculation in a third embodiment of the effective address pre-calculation type pipelined microprocessor in accordance with the present invention. In FIG. 3, constituents corresponding to those shown in FIG. 2 are given the same Reference Numerals, and explanation thereof will be omitted.

In the third embodiment, the copy register identification code latch 205, the identification code comparator 206 and the copy register identification code latch signal 604 provided in the second embodiment are removed, and there is provided a predetermined register use detector 301 for decoding the instruction code 108 so as to detect that a predetermined register included in the register file 104 is used as the base address register.

With this arrangement, only when the predetermined register included in the register file 104 is used as the base address register, the predetermined register use detector 301 generates an active output, which is supplied to the timing generator 208 through an AND gate 612 which also receives the auto-modification addressing detection signal 602. As a result, the timing generator 208 is activated so that the updating of the copy register 201 and the reading of the copy register 201 to the base address bus 609 are performed similarly to the first embodiment.

Figure 4:
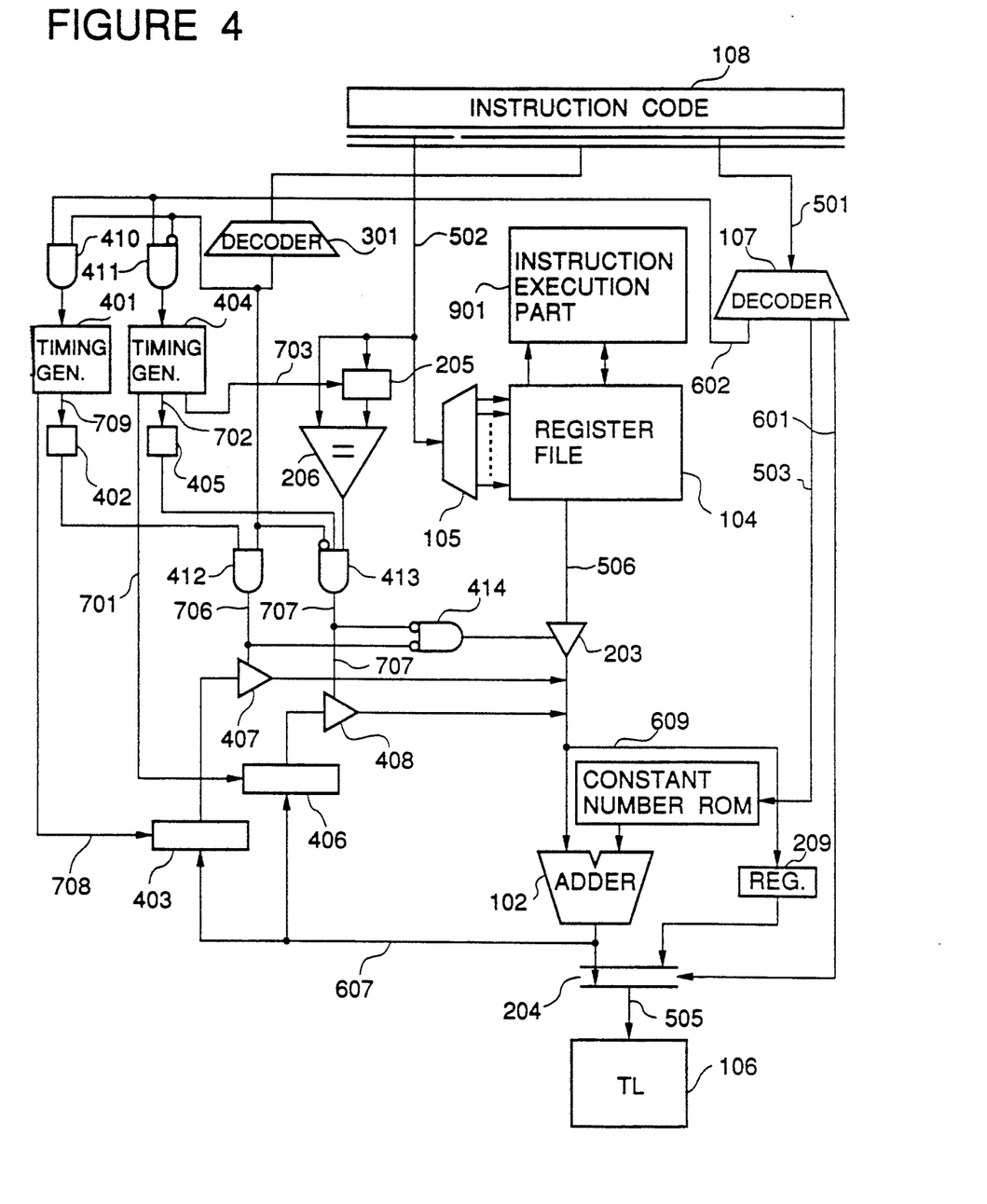

Referring to FIG. 4, there is shown a block diagram of essential parts for the effective address pre-calculation in a fourth embodiment of the effective address pre-calculation type pipelined microprocessor in accordance with the present invention. In FIG. 4, constituents corresponding to those shown in FIGS. 2 and 3 are given the same Reference Numerals, and explanation thereof will be omitted.

In addition to the copy register identification code latch 205 and the identification code comparator 206 provided in the second embodiment and the predetermined register use detector 301 provided in the third embodiment, the fourth embodiment includes a predetermined register copy register 403 used when the predetermined register is designated as the base address register, a predetermined register copy register read buffer 407 connected to an output of the predetermined register copy register 403, a timing generator 401 for the predetermined register, and a predetermined register copy valid flag 402. Furthermore, the fourth embodiment includes a not-predetermined register copy register 406 used when a register other than the predetermined register is designated as the base address register, a not-predetermined register copy register read buffer 408 connected to an output of the not-predetermined register copy register 406, a timing generator 404 for the not-predetermined register, and a not-predetermined register copy valid flag 405.

The timing generator 401 for the predetermined register is activated by an output of an AND gate 410 receiving an output of the predetermined register use detector 301 and the auto-modification addressing detection signal 602, so that the timing generator 401 supplies an active predetermined register copy register latch signal 708 and an active predetermined register copy valid set signal 709 to the predetermined register copy register 403 and the predetermined register copy valid flag 402, respectively. On the other hand, since the timing generator 404 for the not-predetermined register is activated by an output of an AND gate 410 receiving an inverted signal of the output of the predetermined register use detector 301 and the auto-modification addressing detection signal 602, a not-predetermined register copy register identification code latch signal 703, a not-predetermined register copy valid set signal 702 and a not-predetermined register copy register latch signal 701 are not generated when the output of the predetermined register use detector 301 is active. Therefore, a preceding modification value of the predetermined register is prevented from being latched in both of the predetermined register copy register 403 and the not predetermined register copy register 406.

An output of the predetermined register copy valid flag 402 is connected to a first input of an AND gate 412, which has a second input connected to receive the output of the predetermined register use detector 301, so that the AND gate 412 generates a predetermined register copy register read signal 706 to the buffer 407. In addition, an output of the not-predetermined register copy valid flag 405 is connected to an first input of another AND gate 413, which has a second and inverted input connected to receive the output of the predetermined register use detector 301 and a third input connected to the output of the identification code comparator 206, so that the AND gate 413 generates a not-predetermined register copy register read signal 707 to the buffer 408. The predetermined register copy register read signal 706 and the not-predetermined register copy register read signal 707 are connected to a NAND gate 414, whose output is connected to the control input of the buffer 203. Therefore, the reading of the base address register value from the register file 104 is executed only when both of the predetermined register copy register read signal 706 and the not-predetermined register copy register read signal 707 are inactive.

A basic operation of the fourth embodiment is similar to the second and third embodiments, and therefore, explanation thereof will be omitted.

The invention has thus been shown and described with reference to the specific embodiments. However, it should be noted that the present invention is in no way limited to the details of the illustrated structures but changes and modifications may be made within the scope of the appended claims.

I claim:

1. An effective address pre-calculation type pipelined microprocessor comprising:
 a register file which can be used to provide a base address for an operand address;
 an effective address calculation unit for calculating and generating an effective address of an operand prior to execution of an instruction, by using a register included in register file as a base address register;
 a copy register for selecting and holding either the calculated effective address or a modification amount added result obtained by adding a constant number to the calculated effective address;
 a decoder for detecting a predetermined addressing mode indicative of a predetermined operand address designation mode;
 a timing generator for controlling the writing of the calculated effective address or the modification amount added result to the copy register when the predetermined addressing mode is used;
 a copy valid flag for storing a written condition of the copy register;
 a copy register identification code latch for storing an identification code of a register which is used as a base address register when the predetermined addressing mode is designated;
 a logic circuit detecting whether a value of the copy register identification code latch is consistent with a base address register number in an instruction code; and
 a data path means for supplying the value of the copy register to the effective address calculation unit when the copy valid flag indicates that the copy register has been written and when a value of the copy register identification code latch is consistent with the base address register number.

2. An effective address pre-calculation type microprocessor claimed in claim 1 wherein said logic circuit comprises:
   an identification code comparator for comparing the base address register number of an instruction code with a value held in the copy register identification code latch in order to detect that the base address register number is equal to the value held in the copy register identification code latch; and
   an AND gate, an output of the copy register valid flag and an output of the identification code comparator being coupled to the AND gate, which generates a copy register read signal supplied to a control input of the data path means.

3. An effective address pre-calculation type microprocessor claimed in claim 1 wherein said logic circuit comprises:
   a predetermined register use detector for decoding an instruction code to detect that a predetermined register included in the register file is used as the base address register, the predetermined register use detector generating an active output only when the predetermined register included in the register file is used as the base address register;
   a first AND gate connected to receive an automodification addressing detection signal from the decoder to supply the active output of predetermined use detector to the timing generator; and
   a second AND gate connected to receive an output of the copy register valid flag and the active output of the predetermined use detector to generate a copy register read signal supplied to a control input of the data path means.

4. An effective address pre-calculation type microprocessor claimed in claim 1 wherein said copy register comprises a predetermined copy register and a complementary predetermined copy register, said timing generator comprises first and second timing generators, said copy valid flag comprises a predetermined copy valid flag and a complementary predetermined copy valid flag, said data path means comprises first and second data path means, and said logic circuit comprises:
   a predetermined register use detector for decoding an instruction code to detect that a predetermined register included in the register file is used as the base address register, the predetermined register use detector generating an active output only when the predetermined register included in the register file is used as the base address register;
   a first and second AND gates connected to receive an auto-modification addressing detection signal from the decoder, said first AND gate being connected to supply the active output of the predetermined use detector to the first timing generator and said second AND gate being connected to supply an inactive output of the predetermined use detector to the second timing generator;
   a third AND gate receiving an output of the predetermined copy register valid flag and the active output of the predetermined use detector to generate a predetermined copy register read signal supplied to a control input of the first data path means;
   an identification code comparator for comparing the base address register number of an instruction code with a value held in the copy register identification code latch in order to detect that the base address register number is equal to the value held in the copy register identification code latch; and
   a fourth AND gate, an output of the complementary predetermined copy register valid flag and an output of the identification code comparator being coupled to the AND gate, which generates a copy register read signal supplied to a control input of the second data path means, said third and fourth AND gates being respectively controlled by the active and inactive outputs of the predetermined use detector.

* * * * *